Figures 1, 2:
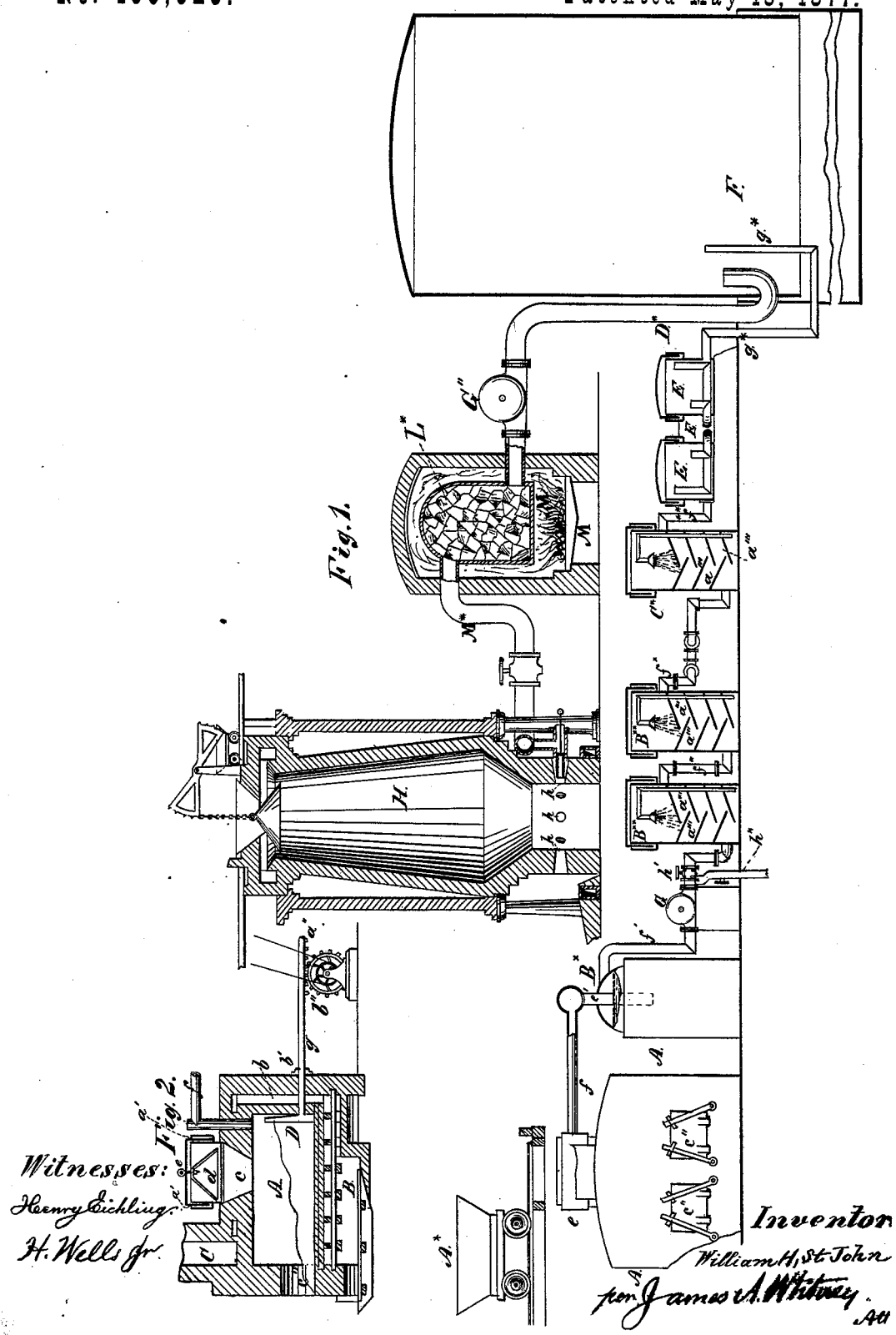

W. H. St. JOHN.
MANUFACTURE OF IRON.

No. 190,926. Patented May 15, 1877.

Witnesses:
Henry Eichling.
H. Wells Jr.

Inventor
William H. St John
per James A. Whitney.
Att

UNITED STATES PATENT OFFICE.

WILLIAM H. ST. JOHN, OF NEW YORK, N. Y.

IMPROVEMENT IN THE MANUFACTURE OF IRON.

Specification forming part of Letters Patent No. 190,926, dated May 15, 1877; application filed January 29, 1876.

*To all whom it may concern:*

Be it known that I, WILLIAM H. ST. JOHN, of the city, county, and State of New York, have invented certain Improvements in the Manufacture of Iron, of which the following is a specification:

The difficulty hitherto experienced in the manufacture of iron free from sulphur arises not only from the presence of this impurity in the ore, but also in an even greater degree from its presence in the fuel; and, moreover, the injurious presence of phosphorus is due to the fact that the usual fuel of the blast-furnace, and the manner of its application, fails to eliminate the obnoxious element during the reduction of the iron to metallic form.

The object of my invention is to provide for, and carry into practice, the manufacture of iron free from sulphur and phosphorus by means of fuel thoroughly purified from injurious ingredients, and applied in the blast-furnace in such manner as to secure, by the chemical reactions involved, the elimination of the sulphur and phosphorus that may have existed in the ore.

To this end my invention embraces a novel process of iron-manufacture, in which the fuel is first partially distilled to separate for subsequent use the purer hydrocarbon gases therefrom, and then subjected to a second and higher distillation, to eliminate from the fuel the sulphurous matter, &c., in order to provide also for subsequent use a pure carbon coke, in which, further, the purer hydrocarbon gases first separated from the coal are passed through washing and purifying apparatuses to remove the ammonia and coal-tar, and thence passed to a gasometer for storage and for supply to a blast-furnace, in which both the purified coke and the purified gas are used in the operation of smelting, the coke to perform the usual and normal work of deoxidizing the ore, while the gas not only assists in this, but, by decomposition and recombination, unites with the sulphur and phosphorus, and causes the same to pass off in the form of sulphureted and phosphoreted hydrogen, thereby insuring the production of iron free from these obnoxious and hurtful impurities.

The invention further comprises, in the manufacture of iron, the decarbonizing of the purified carbureted-hydrogen gas by passing the same through a retort filled with incandescent mineral material, and then passing the same to a suitable cupola or furnace, whereby the same result of an iron purified from sulphur, phosphorus, &c., is secured, together with a stronger heat in the furnace, and a more rapid, effective, and economical reduction of the ore.

The invention further comprises a novel combination of a retort or coking-oven, gas-purifying apparatus, fan-blower, or its equivalent, gasometer, and blast-furnace, whereby my aforesaid process may be most conveniently, effectively, and economically carried into practice.

The invention also comprises a novel construction of retort, whereby in the production of the purified coke the discharge of the latter from the coking-oven is greatly cheapened and facilitated.

In the accompanying drawing, Figure 1 is a side view and partial section, representing the hereinbefore-specified combination or means of carrying my aforesaid process into practice; and Fig. 2 is a detached sectional view of the retort or coking-oven, forming one element of said combination.

Having reference, first, to Fig. 2, A is the retort or coking-oven, heated from the furnace B beneath, the hot products of combustion from the furnace passing into the chamber $b$, surrounding the oven A, before said products pass to the uptake C. The inlet $c$ of the oven (through which the charge of bituminous coal is passed thereto) is closed by the bell $d$ and cap $e$, the edge of the latter resting in an annular water lute or seat at $a'$, which renders the closure of said inlet perfectly gas-tight. The gas-outlet pipe of the oven A is shown at $f$. The oven is provided with one or more reciprocating plungers, D, the shafts $g$ of which pass through fire-clay sleeves or sockets $b'$ in the walls of the oven. External to the latter the shafts $g$ are provided with a rack, $a''$, each gearing into a spur-pinion, $b''$, which may be rotated in either direction by any suitable means, to give to the plungers a movement to and from the doors over coke-outlets $c''$ of the oven. By operating the plungers the mass of coke, after the distillation of the coal is completed, may be forced out bodily from the oven preliminary to its transfer to the blast-furnace, as hereinafter described.

For convenience and economy of labor it is designed to charge the retort or oven from a trolley, $A^*$, run on elevated rails to and above the inlet $c$, as indicated in Fig. 1.

Having reference, now, to Fig. 1, the gas-outlet pipe $f$ extends from the oven or retort A to the dip-pipe $e'$, which, of course, dips beneath the surface of water contained in the inclosing-chamber $B^*$ of the said dip-pipes. A suitable pipe, $f'$, passes from the chamber $B^*$ to a system of chambers, $B^{}$, which latter comprise a showering apparatus, by which a shower of water descends through the chamber, while the gas ascends in zigzag course between a series of alternating shelves, $a''' a'''$. This system of chambers $B^{}$ may comprise any desired number of such chambers, from the last of which the gas passes, by a pipe, $f^*$, to still another showering-chamber, $C^*$, in which the gas is deflected, by shelves $a''''$, alternately in opposite directions against and through a downwardly-falling shower of water, the latter, preferably, in all the showering-chambers, being a separate supply, and drawn or forced from any suitable source of water-supply. From this the gas passes, through pipe $f^{**}$, to the compartments of a purifier, E, which is, preferably, of the kind known as "oxide-of-iron purifiers," although a lime-purifier might, perhaps, be used. From the purifier E the gas passes into the gasometer F (the latter of the common construction) by a pipe, $g^*$.

Inasmuch as the gas from the retort or oven must be forced not only against the resistance offered by the dip-pipes, the showering-chambers, and the purifier, but also against the pressure within the gasometer, a fan-blower, G, or equivalent forcing apparatus, is fitted to the gas-conducting pipes, at any desired point between the retort or oven A and the gasometer F, the said blower drawing the gas from the oven or retort as fast as generated, and forcing it, through the various intermediate appliances just hereinbefore described, to the gasometer. From the interior of the latter extends a pipe, $D^*$, provided with a fan-blower, $G''$, and connecting with a retort, $L^*$, surrounded by a furnace, M, and connected, by a pipe, $M^*$, with a blast-furnace, H. On occasion the gas from the gasometer passes to and into the said blast-furnace without the interposition of the retort $L^*$, (when, for instance, the carbureted gas is to be used in the retort, as presently herein explained.) The gas passes to the said furnace H through an annular system of tuyeres, $h$, surrounding and entering at its boshes. The said blast-furnace H may be of any suitable construction adapted for use with solid and gaseous fuel combined, and requires no specific description.

It must be particularly observed that the gas passed, as described, from the retort or oven A to the gasometer F is that which comes from the coal in said retort or oven at the earliest stage of distillation, during which the proportion of sulphur, &c., is comparatively small. This gas is, of course, purified from tar and ammonia by its passage through the dip-pipes and the showering-chambers, and from all traces of sulphur by its passage through the purifier. But when, in the later stages of distillation, the gas becomes more heavily charged with impurities, the elimination of the latter by the means described becomes practically impossible, and hence this impure gas is shut off from passing to the showering-chamber by means of a valve or cock, $h'$, duly provided for the purpose, and it is turned off through a pipe, $h^*$, either into a suitable water tank or pond, or, as in many cases may be found preferable, conducted to the furnace B, to aid, by its combustion, the heating of the oven or retort. This last stage of distillation is protracted for a time, and at a temperature sufficient to thoroughly eliminate the sulphur, &c., from the coal, or, in other words, from the resultant coke, thereby rendering the latter pure and fitted for use in the subsequent operation of the blast-furnace.

In this last operation the blast-furnace is supplied with the purified coke, with iron, and with flux, after the usual manner of charging a blast-furnace, and the purified gas from the gasometer is admitted to the boshes through the annular system of tuyeres, as hereinbefore indicated, and direct from the gasometer, without the interposition of the retort $L^*$. During the intense combustion incident to the smelting under these conditions, the purified coke operates to deoxidize the ore without adding to the charge any portion of sulphur, and simultaneous with this the gas admitted to the blast-furnace not only assists the said deoxidation, but, becoming decomposed, its hydrogen unites with the sulphur and phosphorus of the ore, and forms sulphureted and phosphoreted hydrogen, which pass off in gaseous form, being thereby eliminated from the metal, and leaving the iron resulting from the process pure and free from sulphur and phosphorus, and hence of excellent quality and kind.

I have thus far indicated the use of the carbureted hydrogen passed from the gasometer to the blast-furnace, and utilized in the manufacture of pure iron. It is preferable, however, in the reduction of many ores, and possibly with all, that the carbon of the gas should be eliminated from its carbureted hydrogen previous to its passage to the blast-furnace H. It is for this purpose that the retort $L^*$, with its surrounding furnace and other adjuncts, is interposed between the gasometer and the blast-furnace. This retort $L^*$ is filled with finely-broken pieces of fire-brick or other suitable mineral material, and is made incandescent by the heat of the surrounding furnace.

The secondary fan-blower G'' supplements the action of the gasometer in forcing the gas from the latter through the pipe D*, and in driving the gas through the retort L*, and in contact with the incandescent material contained therein. The carbon is deposited from the gas upon the said material, thereby liberating the hydrogen, which, in its free condition, passes to the furnace H. The carbon is deposited upon the broken incandescent material just mentioned in a form analogous to that of the crystalline carbon commonly found in the interior of gas-retorts. The hydrogen, being set free, passes off in a pure condition, and assumes a volume several times greater than that of the hydrocarbon gas from which it is derived. There is thus caused to pass from the retort into the blast-furnace a steady stream of pure hydrogen gas. This hydrogen, being introduced into said furnace with a suitable inflow of air in lieu of the carbureted hydrogen, has many advantages. The reduction of the metal occurs continuously at the bottom of the furnace. The ore continually descends by its own weight as the process of smelting continues, and, much more than this, the affinity of the hydrogen for whatever phosphorus or sulphur may be contained in the ore at the instant of the separation of these impurities from their combination in the ore causes their elimination in the form of phosphoreted and sulphureted hydrogen, either or both, as the case may be.

What I claim as my invention is—

1. The herein-described method or process of manufacturing iron free from sulphur and phosphorus, by first separating from the coal its purer hydrocarbon gases, and then, by continued distillation, eliminating the impurities from the coke, the separate purification of the purer hydrocarbon gases aforesaid, and the storage of the same in a gasometer, and the subsequent combined and simultaneous use of the purified coke and the purified gases in the blast-furnace, the whole being conducted in the manner substantially as herein set forth.

2. In the manufacture of iron, the decarbonizing of the carbureted hydrogen by passing the same through a retort filled with incandescent mineral materials, and the subsequent passage of the purified hydrogen to the blast-furnace, in conjunction with a suitable inflow of air, substantially as and for the purpose herein set forth.

3. The herein-described combination of a retort or coking-oven, a gas-purifying apparatus, a fan-blower, or its equivalent, a gasometer, and a blast-furnace, the whole arranged for conjoint use and operation, substantially as and for the purpose herein set forth.

4. In the manufacture of iron, the retort A, constructed with a plunger or plungers, D, actuated from without by a rack and pinion, substantially as and for the purpose herein set forth.

WM. H. ST. JOHN.

Witnesses:
H. WELLS, Jr.,
HENRY HUGHES.